Figure 1:
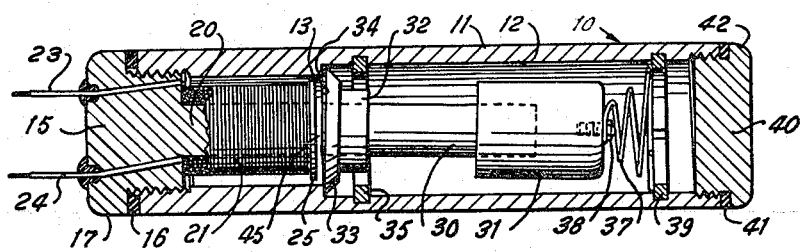

Sept. 29, 1959 M. J. PELLILLO 2,906,994

SEISMOMETERS

Filed March 22, 1955

INVENTOR
Mansueto J. Pellillo

BY

ATTORNEY 2,906,994

SEISMOMETERS

Mansueto J. Peliillo, Dallas, Tex.

Application March 22, 1955, Serial No. 495,930

19 Claims. (Cl. 340—17)

This invention relates to new and useful improvements in seismometers, and is directed particularly to a seismometer which is readily adaptable to use in a system having a plurality of seismometers incorporated in a single cable at spaced intervals and adapted to be laid on the surface of the ground or other formation being studied.

It is desirable in seismic systems of the character with which this device is particularly adapted for use that general vibrational motion be converted into electrical energy by translating only the substantially vertical components of the general vibrational motion into a horizontal motion which is utilized to produce a variation in the magnetic flux between a coil and a magnetic field generated by a permanent magnet, one of which is movable with respect to the other. The variations in magnetic flux so produced are converted into electrical impulses which may be conducted through a suitable amplifying system and be recorded upon suitable seismic recording equipment in the usual and well known manner.

It is, therefore, one object of this invention to provide a seismometer which is so constructed that it transduces vertical components of vibrational motion to electrical impulses.

An important object of the invention is to provide a seismometer which is so constructed that it may be positioned at any radial angular position about its longitudinal horizontal axis to receive and uniformly convert vertical components of vibrational motion to electrical impulses regardless of the radial angular position of the seismometer about its longitudinal horizontal axis.

Still another object of the invention is to provide a small seismometer having a smooth symmetrical construction which is readily adapted to be enclosed in and become a part of a seismic cable having a plurality of electric conductors incorporated therein and a plurality of seismometers positioned at spaced intervals therealong.

A particular object of the invention is to provide a very simple and rugged means for converting substantially only the vertical components of general vibrational motion to a generally horizontal motion, such horizontal motion producing a movement creating a variation in magnetic flux between a coil and a magnetic field generated by a permanent magnet by relative movement of one of the coil or the permanent magnet with respect to the other.

Still another object of the invention is to provide a seismometer having a simplified and rugged construction, wherein a mass is resiliently supported in the seismometer case in such a manner that one portion of the mass moves with respect to the seismometer case while the other portion remains substantially still, the horizontal component of motion of the moving end of the mass being used to produce variations in the magnetic flux by relative movement between a coil and a magnetic field generated by a permanent magnet to generate an electrical impulse which may be suitably amplified and recorded.

Still another object of the invention is to provide an improved structure for mounting the mass in a seismometer of the character described in such a manner that the objects hereinbefore set forth may be obtained.

Figure 3:
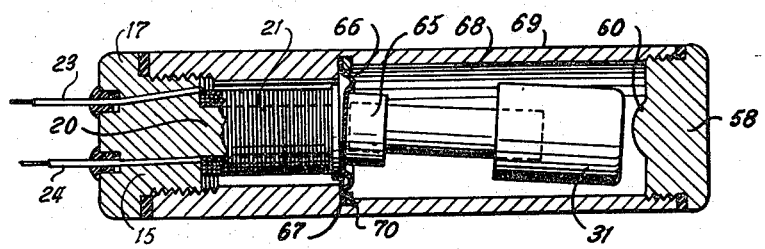
Figure 4:
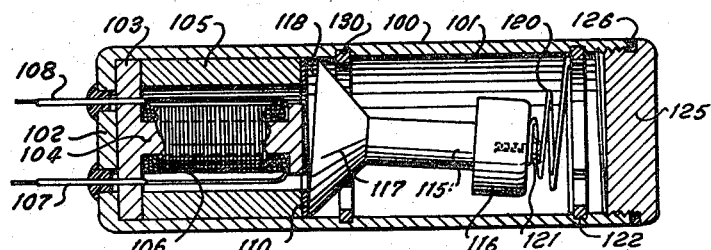
Figure 5:
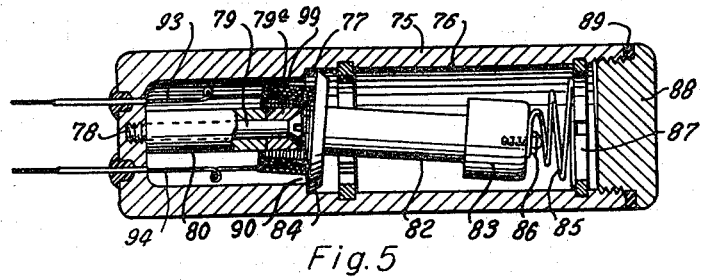
Figure 2:
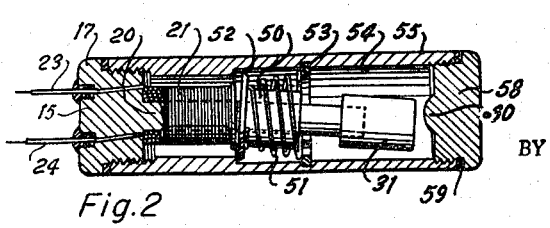

Additional objects and advantages of the invention will be readily apparent from the reading of the following description of devices constructed in accordance with the invention, and reference to the accompanying drawings thereof, wherein:

Figure 1 is a longitudinal vertical sectional view through a seismometer constructed in accordance with the invention, Figure 2 is a longitudinal vertical sectional view through a slightly modified form of the seismometer, Figure 3 is a similar view showing still another modification of the seismometer mass mounting, Figure 4 is a longitudinal vertical sectional view of a further modified form of the seismometer, and Figure 5 is a longitudinal vertical sectional view of a still further variation of the seismometer.

In Figures 1, 2 and 3 of the drawings, seismometers are illustrated in which the relative movement of a permanent magnet with respect to a coil of magnet wire mounted in close proximity to one pole of the permanent magnet acts to change the reluctance of the magnetic circuit in response to relative movement of the case of the seismometer with respect to the mass of the seismometer. An electrical potential is thereby induced in the coil of magnet wire positioned on the core adjacent the pole of the permanent magnet. In each form of the invention shown in these figures, the mounting for the permanent magnet and the seismic mass is the variable structural difference. Other details of structure and operation remain the same.

In Figure 1, the seismometer 10 includes a cylindrical soft iron case 11 having a longitudinal bore 12 therethrough which is reduced intermediate the ends of the case to provide an annular shoulder 13 located closer to one end of the case than the other. A soft iron closure member 15 is screw-threaded into one end of the case 11, and a sealing gasket 16 interposed between the end of the case and an external annular flange 17 on the closure member prevents fluid leakage therebetween. An axially disposed reduced soft iron field pole piece 20 formed integral with the closure member extends axially inwardly of the case to a point substantially in the plane of the annular shoulder 13 in the case, and a coil of fine magnet wire 21 is wound on this core and has its opposite ends 23 and 24 extending outwardly through suitable sealed passages in the closure member 15. A flat disk or ring 25 of a non-magnetic material such as brass is secured to the inner end of the pole piece to form a flange for supporting the inner portion of the coil of wire to prevent displacement of the wire from the pole piece.

An elongate permanent magnet member 30 has a large brass or other nonmagnetic material weight member or seismic mass 31 secured to one end and a supporting collar 32, also formed of a non-magnetic material, rigidly affixed to its opposite end. The collar 32 is provided with an external annular flange 33 having its peripheral edge substantially in the form of the frustum of a cone with the base positioned adjacent the shoulder 13 in the case. The diameter of the base of the flange is such that only a small clearance exists between the base of the flange and the wall of the bore 12 of the case, whereby movement of the collar transversely of the case is substantially eliminated. Longitudinal movement of the collar and the magnet to which it is secured toward the soft iron pole piece 20 and the coil of magnet wire 21 is limited by the engagement of the base of the flange 33 with the shoulder 13 in the bore of the case, while movement of the collar in the opposite direction is limited by a non-magnetic snap ring 35 which is positioned in a suitable annular recess formed in the bore 12 of the case at a point spaced from the shoulder 13.

The end of the magnet opposite the collar 32, having the seismic mass 31 mounted thereon, is supported by a non-magnetic spiral coil spring 37 which is secured at its smaller end by means of a screw 38 to the outer end of the mass 31. The larger end of the spring is fixed by any suitable means, such as silver soldering, brazing, or the like, to a split spring anchor ring 39 which is disposed in an internal annular groove formed in the bore 12 of the case adjacent its outer end. The extreme outer end of the case is closed by a plug or sealing cap 40 which is threaded into the bore 12 of the case and has a sealing gasket 41 disposed between the end of the case and an external annular flange 42 on the cap.

It will be seen that the magnetic circuit between opposite ends of the magnet 30 is established in the following manner, from the pole at the end of the magnet adjacent the soft iron pole piece 20 the circuit travels along the pole piece to the case 11 which surrounds the opposite end or pole of the magnetic element 30. The flange 33 on the collar 32 supports the magnet 30 in such a manner that one end is in substantially axial alignment with the inner end of the soft iron pole piece 20, and the base 34 of the flange engages the shoulder 13 to limit movement of the magnet toward the pole piece so that a gap 45 exists between the magnet and the pole piece. The combined weight of the magnet and of the non-magnetic seismic mass 31 is such that the magnetic flux at the magnetic gap 45 between the end of the magnet and the end of the pole piece acting in combination with the spring 37, will permit the center of gravity of the magnet to fall slightly below the longitudinal horizontal axis of the case. Also, the center of gravity of the magnet will not rise above the longitudinal horizontal axis of the case for all movements of the various components of the seismometer within the range of significant values.

When the seismometer is in use, any vibration of the ground or formation on which the seismometer is positioned in a substantially horizontal position will produce a vertical movement of the seismometer case, which will produce a change in the width of the gap 45 between the magnet and the pole piece, since the seismic mass or weight 31 will remain substantially stationary due to its intertia, while the end of the magnet adjacent the pole piece will be pivoted about the fulcrum provided by the base 34 of the flange engaging the angle between the shoulder 13 and the wall of the bore 12 of the case and lifting that end of the magnet with the case. Thus, the end of the magnet adjacent the pole piece will swing outwardly away from or inwardly toward the pole piece to cause a variation in the magnetic flux in the pole piece, which will induce an electrical potential in the coil 21 proportional to the velocity of the vertical movement of the seismometer case. The leads 23 and 24 from the coil are connected to suitable seismic amplifying and recording equipment, whereby the generated impulse is recorded for later interpretation in the well known manner.

Lateral movements of the seismometer case produce relatively small changes in the magnetic gap 45, since such movement causes one side of the gap to become wider, while the other side becomes narrower. In such cases, the resultant magnetic flux is not substantially varied. Similarly, movements of the ground or the case of the seismometer in a direction along its longitudinal horizontal axis will produce relatively small changes in the gap 45 because of the engagement of the flange 33 with the wall of the bore 12 of the case and because the spring 37 is relatively stiff in the direction of the axis of the seismometer as compared to its compliance in a vertical direction.

As a result, the electrical output of the seismometer is relatively greater for vertical movement than for horizontal movement of the case. Furthermore, a plurality of seismometers of this type may be connected in a single circuit to actuate a single recording channel. In such cases, increased discrimination against lateral movements results, because lateral surface movements will reach the various seismometers with different phase relationship and their effect will be cancelled out electrically. At the same time, seismic energy reflections from considerable depth will reach the combined seismometers in a close phase relationship and produce an additive electrical output from the seismometer combination.

The addition of the weight 31 to the magnet decreases the effect of the negative spring constant of the flux at the gap 45, and thus permits the natural frequency of the seismometer to be relatively independent of the width of the gap or of the magnetic strength of the magnet.

The stop ring 35 limits movement of the mass toward the cap 40 in cases of severe mechanical shock, and prevents damage to the spring and other parts of the seismometer.

It is customary in seismic exploration work to damp seismometers to approximately 50 percent to 70 percent of critical. It is contemplated that a heat stable silicone fluid of the proper viscosity may be used in this seismometer case to provide the desired damping. Obviously, fluid will be readily retained in the bore of the case by the cap 40 and the closure 15, both of which are sealed to the case to prevent fluid leakage.

A slightly modified form of the invention is shown in Figure 2, wherein the supporting collar 50 is axially elongated and a non-magnetic spring 51 in substantially the form of a tapered helix has its small end engaging against the flange 52 and its large end rigidly secured to a snap supporting ring 53 secured in a suitable internal annular groove formed in the bore 54 of the case 55. The strength of the spring 51 and the weight of the seismic mass 31 are so proportioned that the center of gravity of the magnet assembly lies below the longitudinal axis of the seismometer in the manner already described. However, the strength of the spring is such that the seismic mass or weight is held spaced from the wall of the bore 54 of the case, whereby the case may be moved transversely of its longitudinal axis with respect to the magnet assembly.

A closure cap 58 similar to the cap 40 is threaded into the end of the case 55 and has a seal 59 therebetween to prevent fluid leakage. An inwardly projecting boss or bumper 60 is formed on the inner end of the cap and is adapted to limit the longitudinal movement of the mass and the magnet in the case, should the seismometer suffer a sever longitudinal mechanical shock. All other elements of this form of the seismometer are identical to the form first described and the seismometer functions in the same manner as that form of the invention, the only difference being in the mounting for the magnet and the seismic mass in the case.

In Figure 3 a still different form of the seismometer is illustrated, wherein a modified form of mounting for supporting the magnet and the seismic mass is utilized. In this form of the invention, the non-magnetic collar 65 secured to the end of the magnet adjacent the pole piece 20 has secured thereto a non-magnetic spring diaphragm 66 which has its peripheral edge portion rigidly secured between an internal annular shoulder 67 formed in the bore 68 of the case 69 and a non-magnetic clamping ring 70 which is positioned in an internal annular groove formed in the bore of the case adjacent and communicating with the shoulder 67 so that the edge portion of the diaphragm is rigidly secured to the soft iron case at the shoulder 67. The rigidity or stiffness of the diaphragm 66 and the weight of the mass 31 are so selected that in the position of rest, and in the range of significant movements, the center of gravity of the magnet assembly will remain slightly below the longitudinal horizontal axis of the case.

The diaphragm 66 is preferably made of a thin disk of non-magnetic spring material, such as Phosphor bronze, with one or more concentric annular corrugations formed therein to provide uniform compliance at all radial angular positions of the seismometer about the horizontal axis of the case and the magnet. Holes may be provided in the diaphragm to permit the passage of damping fluid therethrough. The bumper 60 on the inner end of the cap 58 provides a safeguard against the deformation of the diaphragm beyond its elastic limits, should the seismometer suffer a severe blow in a longitudinal direction.

A further modification of the seismometer is illustrated in Figure 4, wherein a case 100 is formed of a non-magnetic material and is provided with a substantially cylindrical bore 101 therein extending from one end to a point spaced from the other end so that the latter end 102 is closed. A disk-like base member 103 is positioned in abutment with the closed end of the case and has an axially inwardly extending soft iron pole piece 104 formed integral therewith and projecting longitudinally of the case toward the open end thereof. A cylindrical permanent magnet 105 is positioned with a tight fit in the case and has one end in engagement with the base member 103 and surrounds and is uniformly spaced from the pole piece 104. A coil of magnet wire 106 is wound on the pole piece 104 and the leads 107 and 108 extend outwardly through apertures in the base member and case and which are sealed against fluid leakage. A non-magnetic spacer ring 110 is fixed in the case substantially covering the end of the cylindrical magnet opposite the base member 103 and nearest the open end of the case.

A movable member 115 having a seismic mass and weight member 116 mounted on one end thereof is positioned in the bore of the case and has a frusto-conical pivot member or flange 117 at its opposite innermost end. The diameter of the base 118 of the frusto-conical flange is only slightly smaller than the bore 101 of the case so that the movable member may pivot about the edge of the base of the frusto-conical flange without substantial transverse movement of the base in the case. The weight member is preferably formed of soft iron, so that the magnetic circuit in the seismometer is established from one end of the magnet through the base member 103 and the core or pole piece 104, then across a gap to the base of the frusto-conical flange 117 of the movable member and thence through its edge portions to the annular end of the magnet nearest the open end of the case.

The mass 116 on the weight member is resiliently supported in such a manner that the weight member is disposed substantially axially of the case and that the center of gravity of the weight member falls slightly below the longitudinal axis of the case and does not rise about this axis for movements in the range of significant values. A spiral spring 120 has its small end connected by a screw 121 to the weight member and its opposite larger end rigidly fixed to a split snap ring 122 which is mounted in an internal annular groove in the case adjacent the closure cap 125 threaded into the open end of the case and having a seal member 126 therebetween for preventing fluid leakage out of the case. A split snap stop-ring 130 is positioned in an internal annular groove in the case adjacent but spaced from the magnet and is adapted to engage the frusto-conical flange 117 of the movable member to limit movement of the weight means toward the cap, in cases of severe longitudinal mechanical shock.

The case may be filled with a heat stable silicone fluid for the purpose of damping movements of the movable member in the manner of the forms previously described.

The functioning of this form of the seismometers is essentially the same as that of the old forms previously described, movements of the movable member in response to the vertical components of general vibratory movements creating a change in the magnetic flux of the magnetic circuit and generating an electrical impulse in the coil of wire.

In Figure 5 is illustrated a seismometer having a movable coil disposed about and movable with relation to a fixed permanent magnet to generate the electrical impulse desired upon movement of the seismometer case by the vertical components of a general vibratory movement of the earth or other formation on which the seismometer is resting.

The seismometer includes an elongate cylindrical case 75 made of magnetic material such as soft iron and having a longitudinally extending bore 76 formed therein. The bore is reduced intermediate the ends of the case to provide an annular internal shoulder 77 located closer to one end of the case than the other, and the end of the case nearest the shoulder is completely closed by an end wall 78 which has a screw threaded opening axially disposed therein for receiving the threaded end of a non-magnetic supporting screw 79 preferably formed of brass and threaded into the opening. A permanent magnet 80 which is preferably substantially cylindrical in form, is mounted on the screw 79 between a soft iron sleeve pole piece 79a and the end wall 78 of the case. The pole piece has its innermost end disposed in substantial alignment with the shoulder 77 in the bore of the case and spaced uniformly axially of the case and centrally of the shoulder.

A seismic mass in the form of an elongate rod or movable member 82 having a weight member 83 secured on one end thereof and an external annular support flange 84 formed on its opposite end is positioned in the bore 76 of the housing with the flange or disk 84 closely adjacent the shoulder 77. The rod, weight member, and flange or disk 84 are all formed of a non-magnetic material, as is a spring 85 which is secured at one end by means of a screw 86 to the weight member and at its other end by means of a split snap-lock ring 87 to the case. The snap-lock ring is positioned in an internal annular groove provided in the bore 76 of the case adjacent its outer end and close to the closure cap 88 which is threaded into such outer end of the case and has a seal ring 89 disposed between the flange of the cap and the end of the case to prevent leakage of fluid therepast.

The diameter of the disk or flange 84 is only very slightly less than the diameter of the bore 76 of the housing so that only a small clearance exists between the base of the flange or disk and the wall of the bore of the housing or case. The flange is in the form of the frustum of a cone with the larger base portion 90 adjacent and abutting the shoulder 77 in the housing in the same manner and for the same purpose as the base 34 of the flange 33 engages the shoulder 13 in the form of the invention first described.

A coil of magnet wire wound on a non-magnetic form, which may take the form of a flanged spool or cylinder of a non-magnetic metal which is secured axially of the base 90 of the flange 84, is so positioned by the flange that the coil surrounds the pole piece 79a and is disposed axially thereabout and spaced therefrom so that movements of the coil with respect to the pole piece create an electric impulse in the windings of the coil which may be conducted through the leads 93 and 94 to a suitable amplifying and recording instrument of the well-known character used in seismic exploration.

If desired, a damping fluid of a silicone liquid or the like may be provided in the bore of the case to damp movements of the case and the mass with respect to each other.

When this form of the seismometer is in use, the vertical components of a general vibratory movement of the ground on which the seismometer is resting will be impressed on the case of the seismometer and will cause a relative movement of the weight rod 82 and weight 83 about the fulcrum or pivot formed by the edge of the base 90 of the flange 84 engaging the point of intersection of the shoulder 77 with the bore 76 of the case. This relative swinging movement of the disk or flange with respect to the case causes a similar relative movement of the coil of magnet wire with respect to the fixed magnet 80 and the pole piece 79, and induces an electrical potential on the windings of the coil as it moves across the magnetic field in the annular magnetic gap 99 between the sleevelike pole piece 79a and the reduced portion of the bore of the case adjacent the shoulder 77. The electrical potential induced is proportional to the velocity of movement of the coil caused by the vertical component of the vibratory motion and may be measured suitably by the proper recording equipment.

In all forms of the seismometer, the spring or resilient member swingably supporting the swingable end of the movable member should be of such strength that, for all normal and expected vibratory movement of the movable member in the range of movements of significant values for the instrument, such swingable end of the movable member never engages the wall of the bore of the case or housing, and said movable member does not move above the longitudinal axis of the case or the housing.

It will be seen that each seismometer which has been illustrated and described is so designed that the case may be positioned at any radial angular position about its longitudinal horizontal axis, and that while in any such position will produce identical electrical impulses for corresponding relative movements between the case and the seismic mass or weight. It will also be seen that the seismometers illustrated and described are very simple in structure and very substantial in construction so that they will withstand hard usage. The size and shape of the seismometers are such that they may be incorporated in a seismic conductor cable at spaced intervals therealong, and when positioned on the earth or other formation being tested will lie in a substantially horizontal position with their longitudinal axis in a substantially horizontal position so that only the vertical components of a general vibratory movement of the earth or formation will be recorded.

It will also be seen that novel, simple and rugged means for mounting a seismic mass in a seismometer case has been provided.

It will also be seen that the objects heretofore set forth have been obtained in each form of the invention disclosed.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A seismometer including: a cylindrical housing having an axial bore therein; a pole piece mounted concentrically within the bore of the housing and fixed at one end in the housing and having its other end projecting into the bore of the housing; a member movably mounted in the housing and disposed substantially axially thereof and having at one end a pivot member engaging the wall of the bore of the housing adjacent the projecting end of the pole piece and providing a pivot for said movable member about a point substantially vertically below the end of said pole piece when said housing is positioned horizontally, said movable member having a weight at its opposite end; means resiliently supporting the weight at the end of the movable member in a position spaced from the wall of the bore of the housing; a magnet carried by one of said pole piece and said movable member; a coil of conducting material carried by the other of said pole piece and movable member; said coil and said magnet being disposed in close proximity to each other, whereby movement of the movable member causes movement of one of said magnet and coil with respect to the other to generate an electrical impulse in the coil; said pivot member supporting said one end of said movable member for pivotal movement about the pivot point below the projecting end of the pole piece regardless of the radial angular position of the housing about its longitudinal axis.

2. A seismometer including: a housing, a magnetic structure within said housing including a permanent magnet and pole pieces associated therewith, said pole pieces having faces forming at least one air gap; a movable member in said housing; means providing an annular pivotal support for one end of said movable member adjacent the gap between the pole pieces and a resilient support for said movable member, whereby said movable member is pivotally mounted at one end adjacent the gap and pivotally movable toward and away from said pole pieces at the gap; and a coil positioned adjacent the magnet and pole pieces; one of said magnet and said coil being carried by said movable member and the other of said magnet and said coil being carried by the pole pieces; movement of said movable member causing relative movement between the coil and magnet to alter the gap therebetween and induce an electrical impulse in the windings of the coil.

3. A seismometer including: a housing having a cylindrical bore therein reduced intermediate its ends to provide an internal annular shoulder; a movable member mounted substantially axially within the bore of the housing and having a pivot member at one end thereof, said pivot member being in the form of substantially a frustum of a cone and having its base engaging the intersection of the internal annular shoulder with the bore wall of the housing, whereby the movable member pivots about a point determined by the base edge of the frustum of the pivot member and the angle defined by the internal annular shoulder and the wall of the bore of the housing; a magnet carried by one of the housing or the movable member; a coil of electrical conductor carried by the other of the housing or movable member in close proximity to the magnet; means for resiliently supporting the movable member in the housing for swinging movement of its free end, whereby pivotable movement of the moveable member about the pivot point will cause relative movement between the magnet and the coil of electrical conductor to induce an electrical potential in said conductor.

4. A seismometer including: a housing having a longitudinal bore therein and having an annular internal shoulder intermediate its ends; a movable member mounted in the bore of said housing and having one end resiliently supported; a pivot member mounted on the opposite end of said movable member and engaging the intersection of the shoulder with the wall of the bore of the housing, whereby said movable member pivots about such engagement between the pivot member and the intersection of the shoulder and the bore wall of the housing; a magnet carried by one of the housing or the movable member; means providing a magnetic circuit in said housing; a coil of electric conductor mounted in spaced relation to the magnet in the field of the magnetic circuit in the housing; and means movable in the housing with respect to said means providing said magnetic circuit varying the intensity of the magnetic circuit in response to movements of the movable member to create electric potential in the coil of the electric conductor.

5. A seismometer including: a cylindrical housing having an axial bore therein, a pole piece mounted concentrically within the bore of the housing and having one end connected with the housing and having its other end projecting into the housing bore; an abutment surface formed on the bore wall of the housing surrounding the projecting end of the pole piece; a coil of magnet wire surrounding said pole piece; a movable member mounted in the housing and disposed substantially axially thereof and having at one end a pivot member engaging the abutment surface on the wall of the bore of the housing; means resiliently supporting the movable member for swinging its opposite end about the pivotal engagement of the pivot member with the abutment surface in the bore of the housing, a magnet mounted in the housing and establishing a magnetic circuit therein through the pole piece and the wall of the housing; and means responsive to movement of the movable member in the housing to generate an electrical impulse in the coil of wire.

6. A seismometer of the character set forth in claim 5, wherein the pivot member at one end of the movable member is in the form of the frustum of a cone and having its base of a diameter only slightly less than the diameter of the bore of the housing; and the abutment surface on the wall of the bore of the housing provides annular means on the housing engageable by the frustum base edge of the cone to provide a pivot for the movable member.

7. A seismometer including: a housing having a cylindrical bore therein with an annular abutment surface projecting internally from the wall of said bore; a pole piece mounted fixedly in the bore of the housing and having one end disposed in substantial aligment with the plane of the annular abutment surface and uniformly spaced from the wall of the bore of the housing; a movable member mounted in the housing and disposed substantially axially thereof; means resiliently supporting the movable member in said housing for swingable movement of one end in said housing and providing a pivotal support for the opposite end of said movable member in engagement with the abutment surface in the bore of the housing, the pivot end of the movable member being disposed adjacent but spaced from the end of the pole piece and positioned substantially in alignment with the abutment surface, whereby there is a space between the pivot end of the movable member and the inner end of the pole piece, the pivot member abutting the abutment surface to limit movement of the movable member toward the pole piece to maintain the space therebetween, relative transverse movement of the housing and the outer end of the movable member with respect to each other producing a movement of the pivot end of said movable member relatively longitudinally of the housing away from and toward the end of the pole piece; and means responsive to movements of the movable member in the housing for producing a measurable variable.

8. A seismometer of the character set forth in claim 7, wherein the means for producing the measurable variable includes: a coil of magnet wire carried by one of the housing and the movable member; a magnet carried by the other of the housing and the movable member and mounted in spaced relation to the coil of wire therein and establishing a magnetic circuit in the housing; means responsive to movement of the movale member to generate an electrical impulse in the coil of wire.

9. A seismometer of the character set forth in claim 7 and including: a coil of electric conductor mounted on the pole piece; a cylindrical magnet carried by the housing and positioned therein surrounding and spaced from the pole piece and said coil of wire; and a magnetic conductor on the pivot end of the movable member movable therewith toward and away from the pole piece and magnet to vary the strength of the magnetic field in the housing and to generate an electrical impulse in the coil of wire.

10. A seismometer of the character set forth in claim 7 and including: a coil of wire mounted on the pole member; and a magnet carried by the movable member and movable therewith relatively toward and away from the pole piece and the coil of wire surrounding the same, whereby movements of the movable member generate an electrical impulse in the coil of wire surrounding the pole.

11. A seismometer of the character set forth in claim 7 and including: a magnet mounted on the pole piece and establishing a magnetic circuit between the opposite ends of the pole piece and the housing wall, there being a gap between the innermost end of the pole piece in the adjacent cylindrical wall of the bore of the housing; and a coil of wire supported on the pivot end of the movable member and surrounding and spaced from the innermost end of the pole piece, whereby movements of the movable member will move said coil of wire in the gap between the pole piece and the adjacent wall of the bore of the housing to generate an electrical impulse in the coil of wire.

12. A seismometer of the character set forth in claim 7 wherein: the resilient means supporting the movable member is connected to the outer swingable end of the movable member and to the housing.

13. A seismometer of the character set forth in claim 7 wherein: the resilient means supporting the movable member comprises a spiral coil of wire connected intermediate the ends of the movable member and to the housing wall.

14. A seismometer of the character set forth in claim 19, wherein: the pivot member pivotally supporting the one end of the movable member comprises a resilient diaphragm member secured to the movable member and to the wall of the bore of the housing at the abutment surface.

15. A seismometer including: a housing having a cylindrical bore therein with an annular abutment surface projecting internally from the wall of said bore; a pole piece mounted fixedly in the bore of the housing and having one end disposed in substantial alignment with the plane of the annular abutment surface and uniformly spaced from the wall of the bore of the housing; a movable member mounted in the housing and disposed substantially axially thereof and having at one end a pivot in the form of a resilient diaphragm member secured centrally to said one end of the movable member and having its peripheral edge portion fixed in abutting relationship to the abutment surface in the wall of the bore of the housing, said movable member having its opposite outer end freely swingable about the pivot formed by the diaphragm member, said diaphragm member also forming means for resiliently supporting the movable member for swingable movement of said opposite outer end about the pivot formed by the diaphragm member, the pivot end of the movable member being disposed adjacent but spaced from the end of the pole piece and positioned substantially in alignment with the abutment surface, whereby a space is provided between the pivot end of the movable member and the inner end of the pole piece, the diaphragm member limiting movement of the movable member toward the pole piece to maintain the space therebetween, relative transverse movement of the housing and the outer end of the movable member with respect to each other producing movement of the pivot end of said movable member relatively longitudinally of the housing away from and toward the inner end of the pole piece; and means responsive to movements of the movable member in the housing for producing measurable variable.

16. A seismometer of the character set forth in claim 7 wherein the movable member has a seismic mass on its swingable end normally biasing said swingable end of said movable member to a position below the axis of the housing bore when said housing is in a position in which the axis of the bore is substantially horizontal.

17. A seismometer of the character set forth in claim 3 wherein the movable member has a seismic mass on its swingable end normally biasing said swingable end of said movable member to a position below the axis of the housing bore when said housing is in a position in which the axis of the bore is substantially horizontal.

18. A seismometer including: a housing having a longitudinal bore therein and having an annular internal shoulder intermediate its ends; a movable member in the bore of said housing; means resiliently mounting said movable member in said housing including a pivot member mounted on one end of said movable member and engaging the intersection of the shoulder with the wall of the bore of the housing, whereby said movable member pivots about such engagement between the pivot member and the intersection of the shoulder and the bore wall of the housing; a magnet carried by one of the housing or the movable member; means providing a magnetic circuit in said housing; a coil of electric conductor mounted in spaced relation to the magnet and in the field of the magnetic circuit in the housing; and means movable in the housing with respect to said means providing said magnetic circuit varying the intensity of the magnetic circuit in response to movements of the movable member to create electric potential in the coil of the electric conductor.

19. A seismometer including: a cylindrical housing an axial bore therein; a pole piece mounted concentrically within the bore of the housing and fixed at one end in the housing and having its other end projecting into the bore of the housing; a movable member in said housing disposed substantially axially thereof; means for resiliently supporting said movable member in said housing including a pivot member at one end of said movable member engaging the wall of the bore of the housing adjacent the projecting end of the pole piece and providing a pivot for said movable member about a point substantially vertically below the end of said pole piece when said housing is positioned horizontally, said movable member being in a position with its free end spaced from the wall of the bore of the housing and weighted to swing about said pivot end; a magnet and a coil of conducting material within said housing and disposed in spaced relationship with respect to each other, one of said magnet and coil of conducting material being carried by said pole piece; said coil and said magnet being disposed in close proximity to each other; said movable member providing means movable with respect to one of said magnet and said coil for generating an electrical impulse in the coil of a measurable quantity in response to movements of the movable member.

References Cited in the file of this patent

UNITED STATES PATENTS

| 2,348,225 | Petty | May 9, 1944 |
| 2,418,953 | Raitt | Apr. 15, 1947 |
| 2,659,065 | Cordell | Nov. 10, 1953 |